United States Patent
Kimura et al.

(10) Patent No.: US 7,820,957 B2
(45) Date of Patent: Oct. 26, 2010

(54) OPTICAL ENCODER FOR DETECTING MOVEMENT OF A MOVING OBJECT AND ELECTRONIC EQUIPMENT INCLUDING THE OPTICAL ENCODER

(75) Inventors: Tadamasa Kimura, Tenri (JP); Norikazu Okada, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 205 days.

(21) Appl. No.: 12/166,996

(22) Filed: Jul. 2, 2008

(65) Prior Publication Data
US 2009/0008537 A1    Jan. 8, 2009

(30) Foreign Application Priority Data

Jul. 5, 2007 (JP) ............... P2007-177199
May 16, 2008 (JP) ............... P2008-129779

(51) Int. Cl.
*G01D 5/34* (2006.01)
*H01L 31/00* (2006.01)

(52) U.S. Cl. ............... 250/231.18; 250/214.1

(58) Field of Classification Search ............ 250/231.1, 250/231.13–231.18, 237 R, 237 G, 221, 214.1, 250/214 R, 206; 341/11, 13, 14, 31; 356/615–619; 359/436–442, 556; 31/1 PT, 1 N
See application file for complete search history.

(56) References Cited

U.S. PATENT DOCUMENTS

| 4,654,525 | A |   | 3/1987  | Ebina et al. |
|---|---|---|---|---|
| 4,912,322 | A | * | 3/1990  | Ichikawa ............... 250/237 G |
| 5,438,193 | A | * | 8/1995  | Takagi et al. ............ 250/231.18 |
| 6,154,278 | A |   | 11/2000 | Ito et al. |
| 7,223,963 | B2 |  | 5/2007  | Okada et al. |
| 7,312,437 | B2 | * | 12/2007 | Hane .................... 250/237 G |
| 7,329,858 | B2 |  | 2/2008  | Okada |
| 2006/0226349 | A1 | * | 10/2006 | Okada et al. ............ 250/231.13 |
| 2007/0008192 | A1 | * | 1/2007  | Fujita .................... 341/50 |

FOREIGN PATENT DOCUMENTS

| JP | 59-40258 A    | 3/1984  |
|---|---|---|
| JP | 60-88316 A    | 5/1985  |
| JP | 01-291101 A   | 11/1989 |

(Continued)

*Primary Examiner*—Que T Le
*Assistant Examiner*—Jennifer Bennett
(74) *Attorney, Agent, or Firm*—Birch, Stewart, Kolasch & Birch, LLP

(57) ABSTRACT

This optical encoder includes a light emitting section and a plurality of light receiving elements placed so as to be aligned in one direction in an area where a light beam from the light emitting section may reach. The moving object includes a light-ON section and a light-OFF section. The light receiving element detects movement of the moving object when the light-ON section and the light-OFF section of the moving object pass through a predetermined position corresponding to the light receiving element A light receiving signal processing section receives inputs of a plurality of light receiving signals with different phases from a plurality of the light receiving elements, performs signal processing including at least one signal processing among a logical operation processing, an addition processing, and a subtraction processing on a plurality of the light receiving signals, and outputs an output signal containing a plurality of signal components which are different in phase and different in signal level with respect to a predetermined threshold level.

8 Claims, 16 Drawing Sheets

FOREIGN PATENT DOCUMENTS

| | | |
|---|---|---|
| JP | 07-181009 A | 7/1995 |
| JP | 11-64042 A | 3/1999 |
| JP | 11-325830 A | 11/1999 |
| JP | 2000-121390 A | 4/2000 |
| JP | 2005-61896 A | 3/2005 |
| JP | 2005-300405 A | 10/2005 |
| JP | 2007-64981 A | 3/2007 |

* cited by examiner

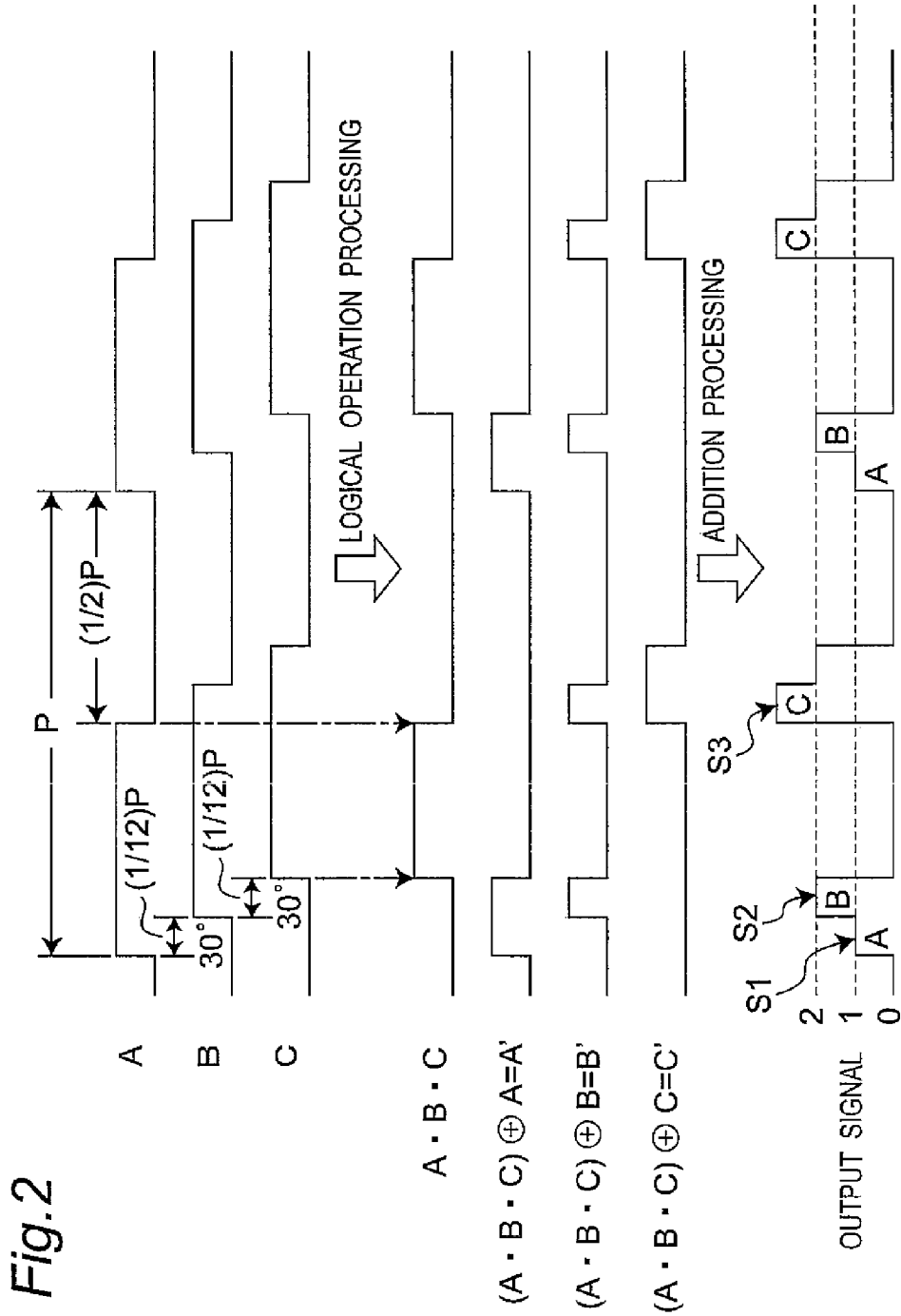

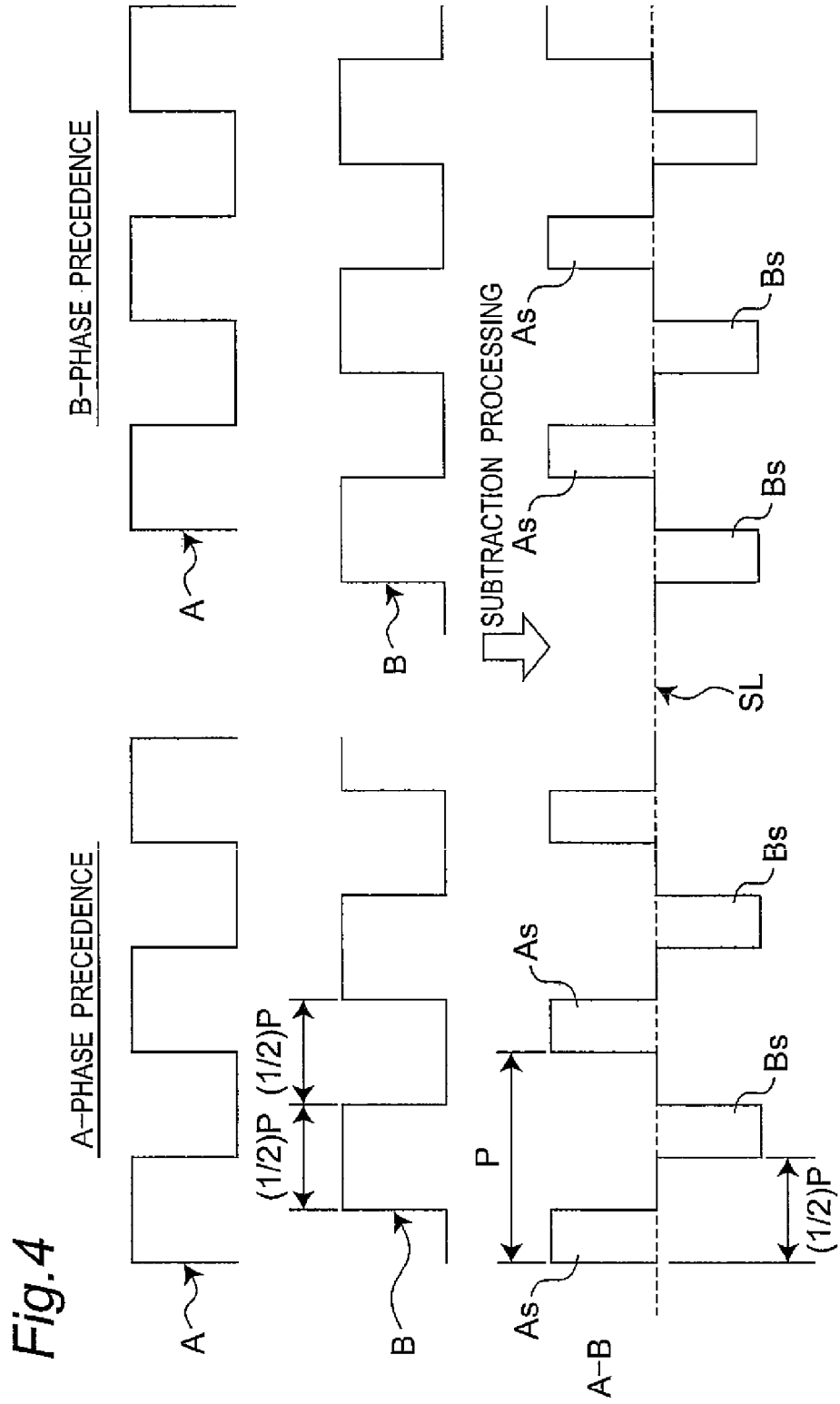

Fig.6A
A
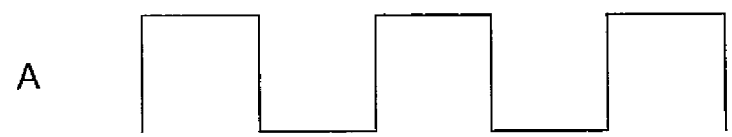
B
A ⊕ B=I
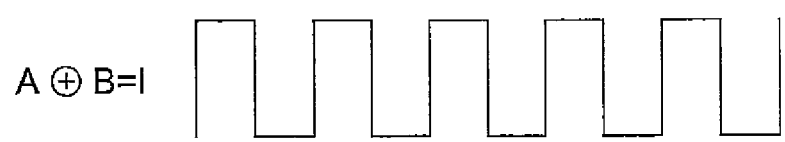
I · B=J
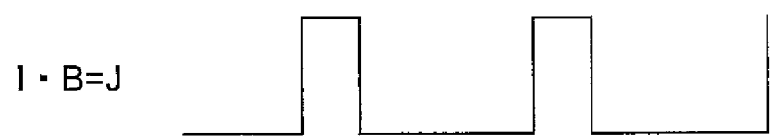
A−J=K
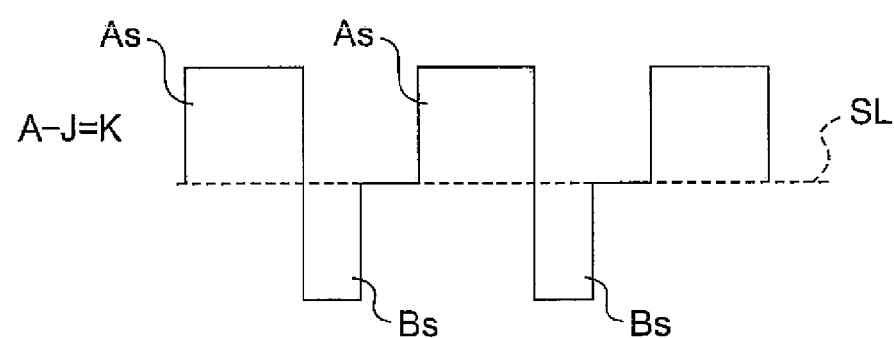

*Fig.6B*
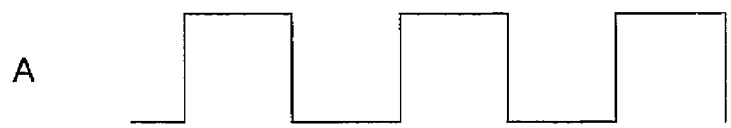
A
B
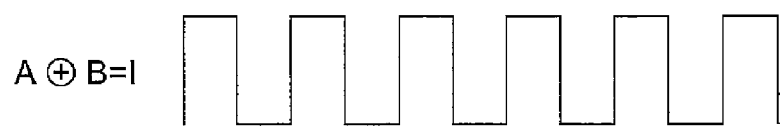
A ⊕ B = I
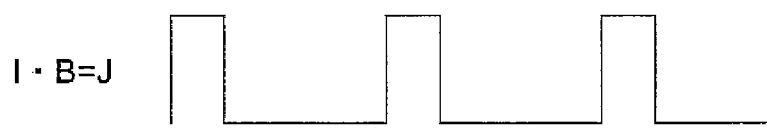
I · B = J
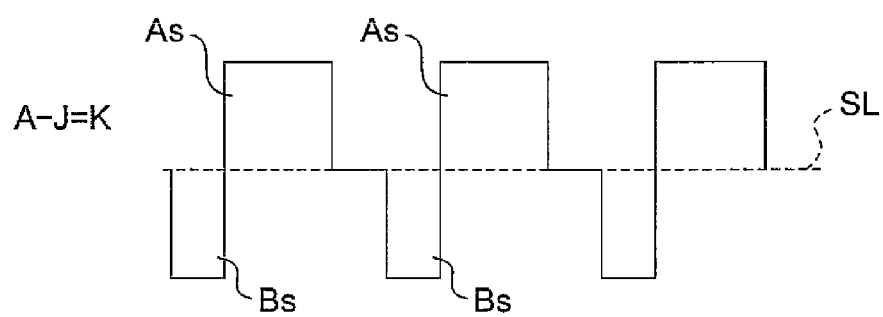
A − J = K
As LOGICAL VALUE → 0 1 1 0 0 1 1 0 0 1 1
Bs LOGICAL VALUE → 1 0 0 0 1 0 0 0 1 0 0
BR

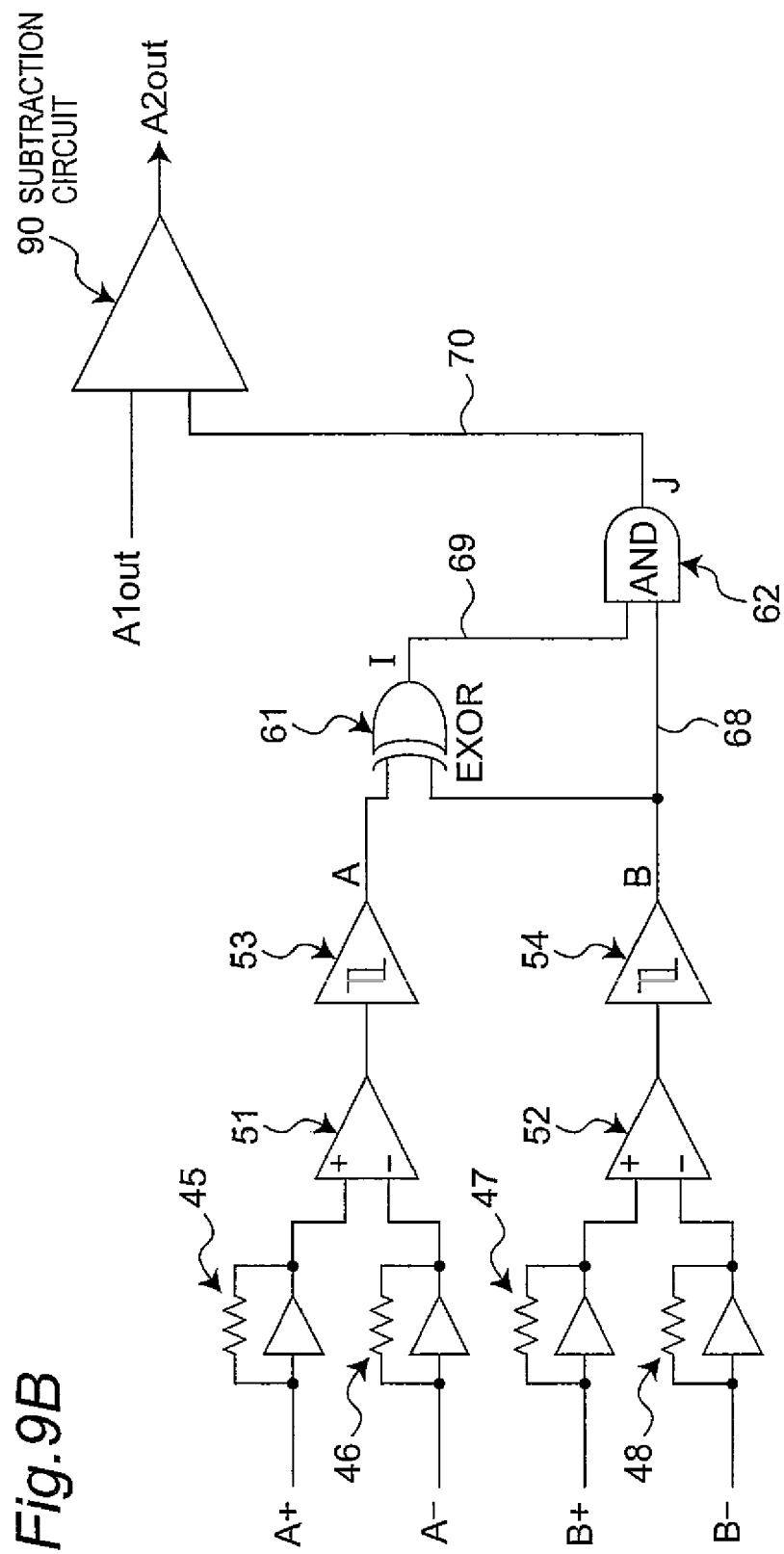

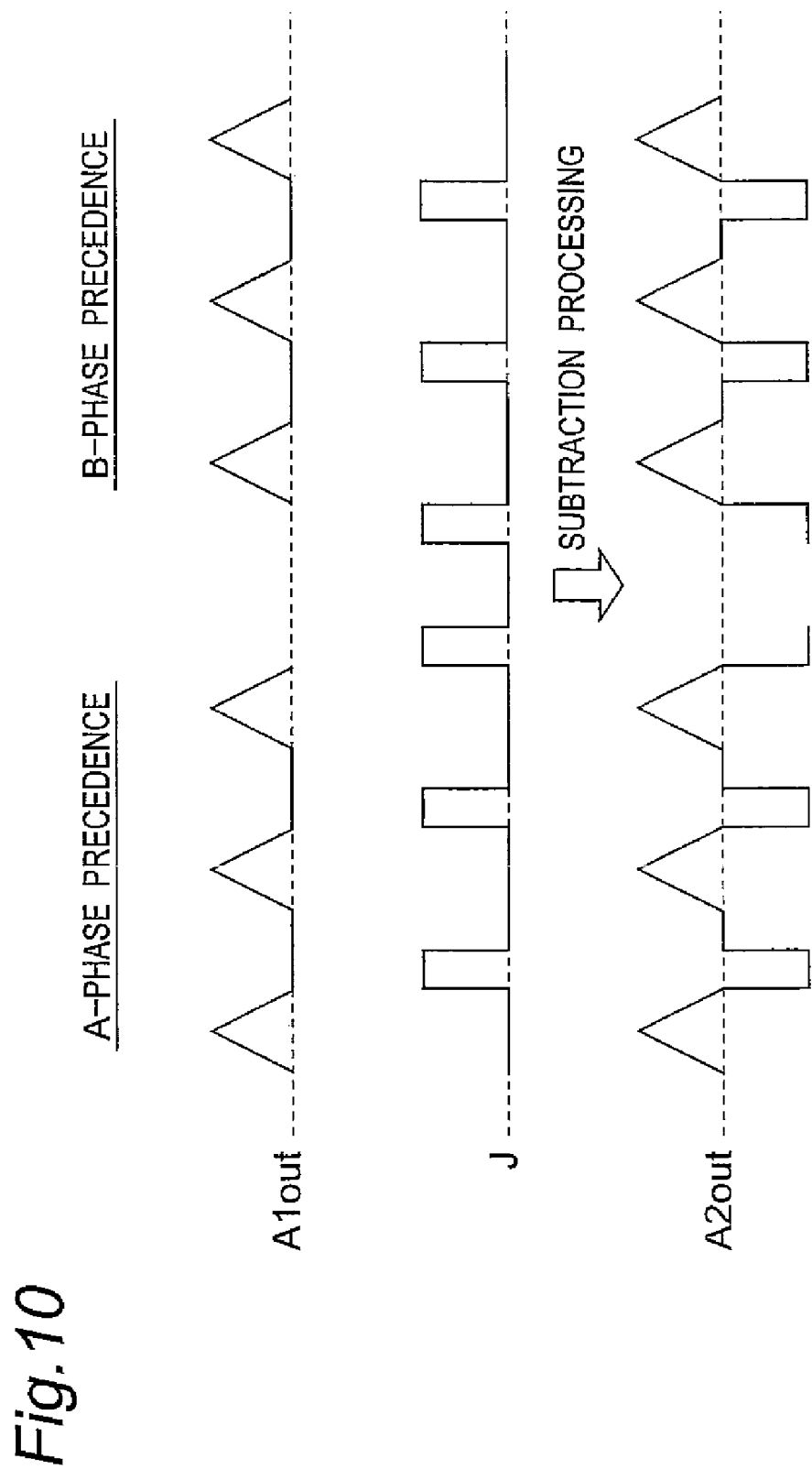

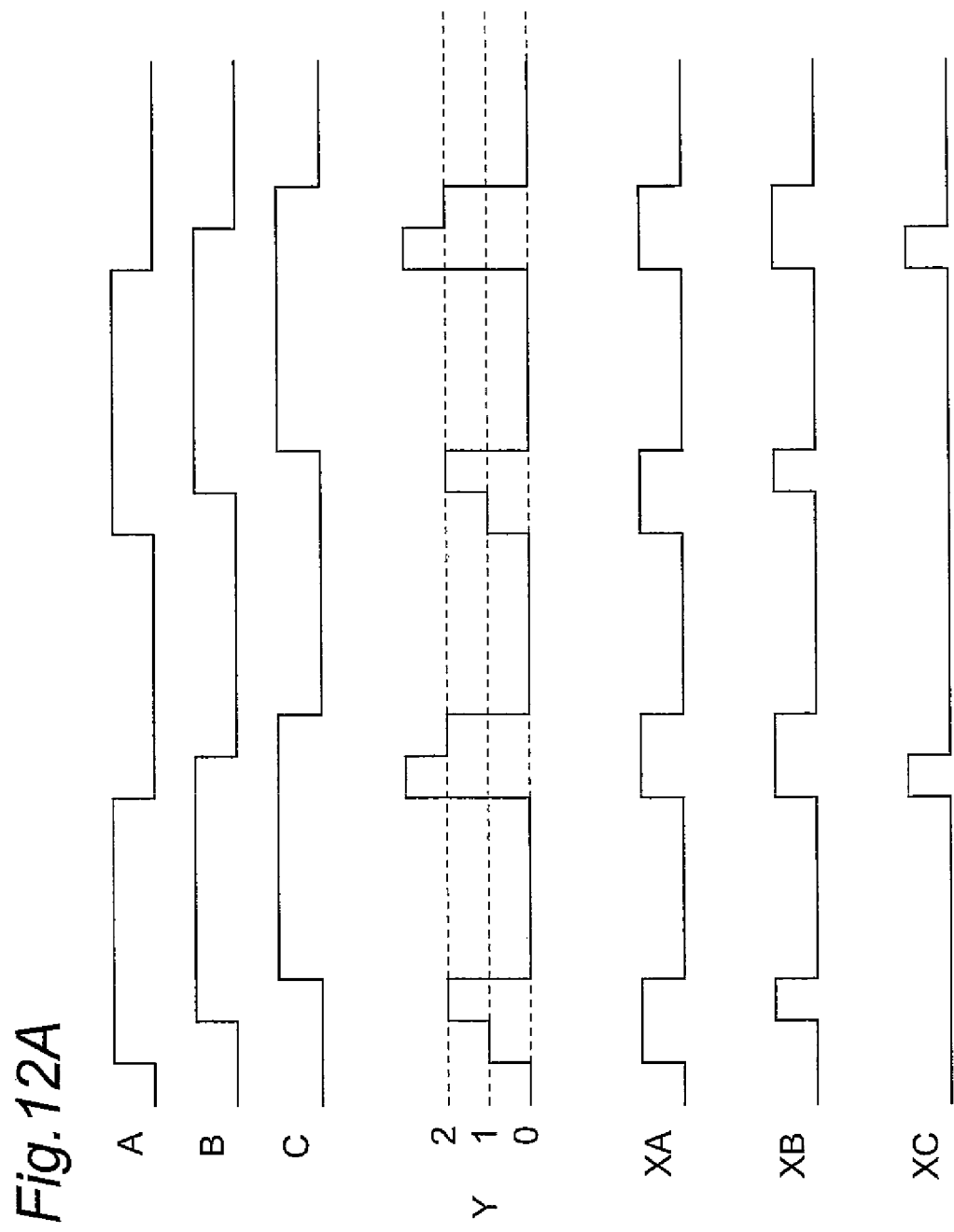

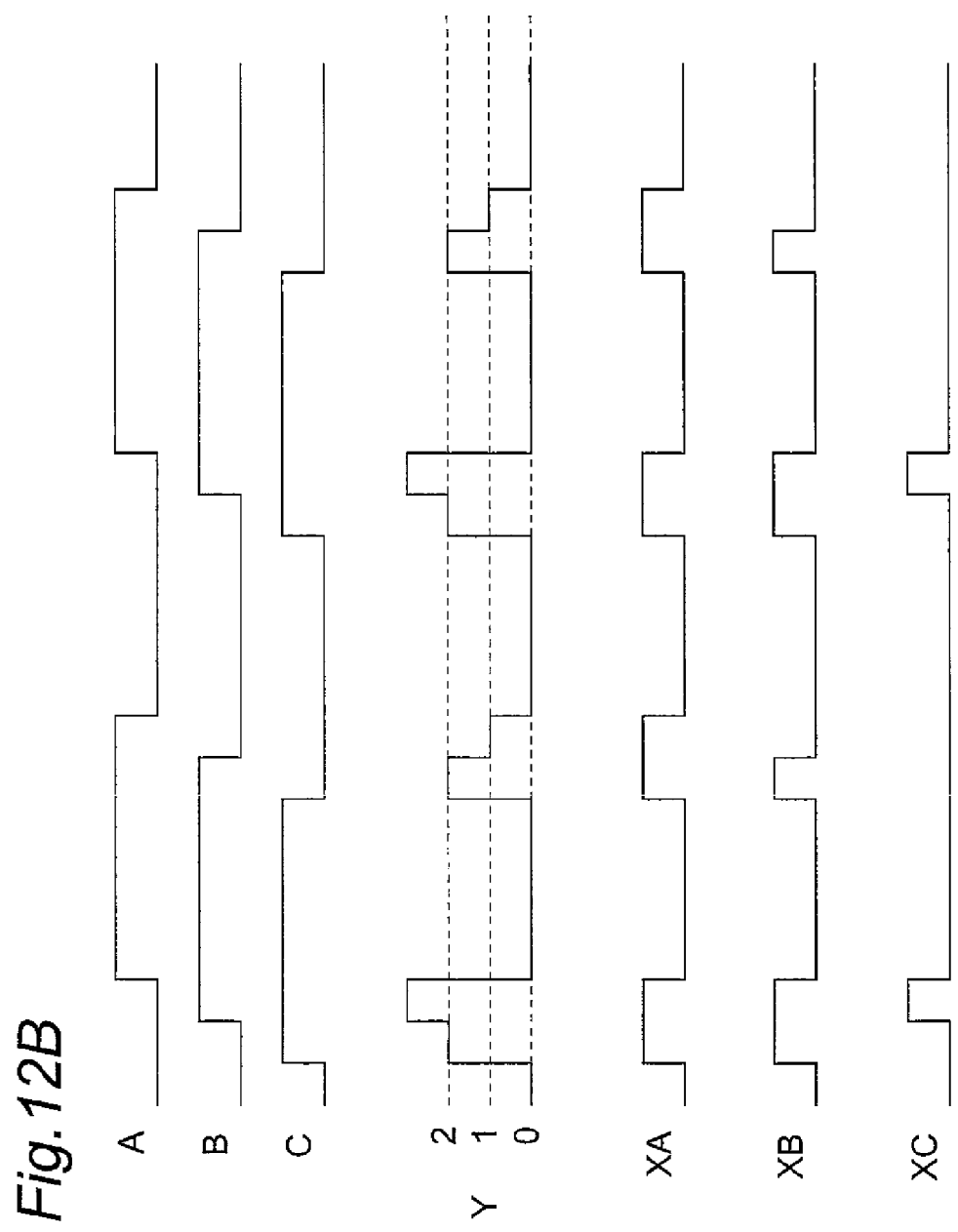

OPTICAL ENCODER FOR DETECTING MOVEMENT OF A MOVING OBJECT AND ELECTRONIC EQUIPMENT INCLUDING THE OPTICAL ENCODER

This Nonprovisional application claims priority under 35 U.S.C. §119(a) on Patent Application No. 2007-177199 filed in Japan on Jul. 5, 2007 and Patent Application No. 2008-129779 filed in Japan on May 16, 2008, the entire contents of which are hereby incorporated by reference.

BACKGROUND OF THE INVENTION

The present invention relates to an optical encoder for detecting the position, the movement speed, the moving direction and the like of a moving object with use of a light receiving element, and more specifically relates to an optical encoder which is preferably used for, for example, printing presses such as copying machines and printers, as well as FA (Factory Automation) equipment.

Conventionally, an optical encoder has been proposed in which a plurality of light receiving elements are placed in an array direction of the slits of a rotor at intervals of ¼ of the array pitch of the slits and in which output signals of these light receiving elements are compared so as to obtain rotation information with high reliability (JP S59-40258 A).

In an optical encoder disclosed in JP 2005-61896 A, a method for enhancing the precision of detecting the movement amount of a moving object by generating and outputting triangular waves is employed.

It has been disclosed in JP 2000-121390 A that pulse conversion is applied to an A-phase signal and a B-phase signal, which have phase difference of 90 degrees, so that these signals are outputted as one A/B-phase pulse signal which is PWM-modulated corresponding to the moving direction of the scale, as a result of which the A-phase and B-phase measurement pulse signals can be outputted with one transmission line.

It has been disclosed in JP S60-88316 A that two phase outputs from a rotary encoder are converted to get counter pulses corresponding to two phases, and one counter pulse is phase-inverted and is added to the other counter pulse, so that signals can be transmitted with a single output signal line.

In the optical encoder disclosed in JP S59-40258 A, the relative position change and the moving direction of a moving object (rotor) are detected with use of two output signals of A-phase and B-phase which are different in phase from each other by 90 degrees.

However, in the optical encoder of JP S59-40258 A, two outputs are provided and therefore interconnections for two outputs are required, which makes the optical encoder lack in simplicity of the signal output interconnections and thereby makes the optical encoder unsuitable for pursuit of miniaturization of a mounting area. Moreover, since the timing of two output signals which should have phase shift of 90 degrees may be changed due to the difference in length of two output interconnections and to the influence of noise applied to each interconnection and the like, an output method with higher reliability is necessary.

In JP 2000-121390 A, pulse conversion is applied to an A-phase signal and a B-phase signal which have phase difference of 90 degrees, so that these signals are outputted as one A/B-phase pulse signal which is PWM-modulated corresponding to the moving direction of the scale.

However, while in the case of a moving object which constantly moves at a fixed cycle, it is possible to detect the moving direction with a PWM (Pulse Width Modulation) signal, in the case of a moving object which does not move at a fixed cycle, it becomes difficult to detect the moving direction of the moving object with high precision due to the pulse width of an output pulse and to the influence of jitter on output components. Moreover, in a signal composed of signal components of two phases, the number of counts of the moved positions in one cycle is only for one phase, and therefore the resolution is also reduced by half compared to the resolution in the optical encoder of JP S59-40258 A.

Moreover in JP S60-88316 A, one of the counter-pulse signals of two phases acquired from the rotary encoder is phase-inverted before these two signals are added together so as to achieve transmission of two signals with a single output signal line. However, as with the case of JP 2000-121390 A, the resolution is reduced by half, which makes it impossible to acquire relative position information with high precision.

Further, it is aimed in both JP 2000-121390 A and JP S60-88316 to reduce the total number of interconnections by signal processing, though devices such as counters, pulse modulators and oscillators are needed. This not only limits the available frequencies but also requires synchronization with an output section and complicates the configuration, which makes it difficult to miniaturize the portion where an encoder module is mounted.

Further in JP 2000-121390 A, PWM modulation is performed under microcomputer control corresponding to the movement information on the moving object. In short, since the PWM modulation is applied depending on the processing speed of the microcomputer or the frequency of an internal oscillator, it is difficult to determine the moving direction at the moment the moving direction of the moving object changes.

Similarly in JP S60-88316 A, the allowable cycle of the moving object depends on the frequency of oscillators. Therefore, although increasing the frequency of the oscillator makes it possible to cover a wide frequency ranges, consumed electric current is increased and therefore this solution is not suitable for practical use.

Moreover, although it is aimed in both JP 2000-121390 A and JP S60-88316 to reduce the total number of interconnections by signal processing, devices such as counters, pulse modulators and oscillators are needed, and this requires synchronization with an output section and thereby complicates the configuration. Consequently, it becomes difficult to miniaturize the portion where an encoder module is mounted.

Also in the optical encoder disclosed in JP 2005-61896 A, as with the optical encoder disclosed in JP S59-40258 A, it is necessary to use two phase outputs for detecting the moving direction.

SUMMARY OF THE INVENTION

Accordingly, an object of the present invention is to provide an optical encoder which is capable of detecting movement information including relative position information and moving direction with high precision, usable in a large frequency range, and which allows reduction in total number of output interconnections so as to be optimal for miniaturization.

In order to accomplish the object, an optical encoder of the present invention comprises:

a light emitting section; and a light receiving section having a plurality of light receiving elements placed so as to be aligned in one direction in an area where a light beam from the light emitting section may reach, for detecting movement of a moving object which is composed of a light-ON section for enabling the light beam to come incident into the light receiving element when the moving object passes through a predetermined position corresponding to the light receiving element, and a light-OFF section for disabling the light beam from coming incident into the light receiving element when the moving object passes through a predetermined position corresponding to the light receiving element, the light-ON section and the light-OFF section alternately passing through the predetermined position when the moving object moves in the one direction, the optical encoder further comprising a light receiving signal processing section for receiving inputs of a plurality of light receiving signals with different phases from a plurality of the light receiving elements, performing signal processing including at least one signal processing among a logical operation processing, an addition processing, and a subtraction processing on a plurality of the light receiving signals, and outputting an output signal containing a plurality of signal components which are different in phase and different in signal level with respect to a predetermined threshold level.

According to the optical encoder of the invention, the light receiving signal processing section converts a plurality of light receiving signals different in phase into an output signal containing a plurality of signal components different in phase and different in signal level with respect to a predetermined threshold level. With this output signal, it becomes possible to transmit a plurality of movement information sets with use of a single transmission path. The output signal has a plurality of output components with different phases in one cycle, so that position information with high precision can be obtained, and miniaturization of encoder modules as well as simplification of electric interconnections can be achieved without lowering the resolution.

In the configuration of the invention, since it is not necessary to configure a synchronous circuit with an internal oscillator, the movement speed of a moving object from is not limited on the circuit. Therefore, according to the invention, it becomes possible to obtain stable outputs in a large frequency range.

The optical encoder of one embodiment, further comprises a plurality of detection sections composed of the light receiving section and the light receiving signal processing section so that a plurality of the detection sections detect movement of a plurality of moving objects which move in directions different from each other.

In the optical encoder of the present embodiment, even in the case where there are two or more moving objects, it becomes possible to obtain highly precise movement information on two or more moving objects and to reduce the number of the transmission paths of output signals by half, so that miniaturization of encoder modules as well as simplification of electric interconnections can be achieved. For example, in the case of detecting moving directions such as two dimensional and three dimensional moving directions with two or more moving objects, the number of the transmission paths of output signals can be reduced by half from conventional number of 4 and 6 to 2 and 3.

In the optical encoder of one embodiment, the light receiving signal processing section comprises a subtraction circuit for subtracting a plurality of light receiving signals and generating an output signal containing a plurality of signal components which are different in phase and different in signal level with respect to a predetermined threshold level.

In the present embodiment, the light receiving signal processing section subtracts a plurality of light receiving signals with the subtraction circuit so as to generate an output signal containing a plurality of signal components different in phase and different in signal level with respect to a predetermined threshold level. Therefore, unlike the conventional example in which a single pulse is created and outputted with use of a pulse modulator or an oscillator, signal processing sections can sufficiently be integrated and reduction in mounting area can be achieved.

In the optical encoder of one embodiment, the light receiving signal processing section comprises:

an exclusive OR circuit for calculating exclusive OR of first and second signals, which are obtained from a plurality of the light receiving signals and which are different in phase from each other by 90 degrees, and outputting a third signal;

an AND circuit for calculating a logical AND of the third signal outputted from the exclusive OR circuit and one signal out of the first and second signals, and outputting a fourth signal; and a subtraction circuit for subtracting the fourth signal outputted from the AND circuit from the other signal out of the first and second signals, and outputting a fifth signal.

In the present embodiment, with the exclusive OR circuit, the AND circuit and the subtraction circuit, the light receiving signal processing section generates a fifth signal containing a plurality of signal components different in phase and different in signal level with respect to a predetermined threshold level, and changes the pulse width of a plurality of signal components of the fifth signal different in signal level. Therefore, in the present embodiment, the pulse width of one phase with respect to the threshold level can be changed with the fifth signal obtained by performing simple logical operation and subtraction on first and second signals which are obtained from a plurality of light receiving signals and which are different in phase from each other by 90 degrees. Therefore, the fifth signal can change a logical value by the forward or backward moving direction of the moving object, and can avoid the detection error regarding whether the moving direction is forward or backward.

In the optical encoder of one embodiment, the light receiving signal processing section comprises a comparison section for comparing a signal outputted from the subtraction circuit with a predetermined reference voltage, and outputting a comparison result.

In the present embodiment, the comparison section included in the light receiving signal processing section outputs the result of comparison between an output signal of the subtraction circuit which may be changed by various optical conditions and a predetermined reference voltage, so that it becomes possible to stabilize the threshold level, avoid downstream signal processing from being complicated due to change in output signals from the subtraction circuit, and to thereby avoid potential malfunction.

The threshold level of the outputs from the comparison section can arbitrarily be changed with the reference voltage. Consequently, it becomes possible to take out only an arbitrary output component in the output of the comparison section, and when high precession is not required, it also becomes possible to obtain only the information on one phase in the information on a plurality of phases contained in the output signal from the subtraction circuit.

In the optical encoder of one embodiment, the light receiving signal processing section comprises a negative feedback circuit including an operational amplifier with an inverting input terminal for receiving an input of the fifth signal outputted from the subtraction circuit and with a non-inverting input terminal for receiving an input of a predetermined reference voltage.

In the present embodiment, the threshold level of the fifth signal from the subtraction circuit can be stabilized by the negative feedback circuit, and by adjusting the gain in the negative feedback circuit, it becomes possible to easily adjust amplitude values of the output signals from the negative feedback circuit with respect to the threshold level.

In the optical encoder of one embodiment, the light receiving signal processing section comprises a reference voltage section which can change a value of the predetermined reference voltage.

In the optical encoder of the present embodiment, by changing the value of the predetermined reference voltage by the reference voltage section included in the light receiving signal processing section, it becomes possible to take out only an arbitrary output component in the output of the comparison section without increasing the number of the output interconnections from the light receiving signal processing section.

In the optical encoder of one embodiment, the light receiving signal processing section comprises an analog signal generation circuit for generating an analog signal, and outputting an output signal containing an analog signal component of the analog signal generated by the analog signal generation circuit.

In the optical encoder of the present embodiment, precession in detecting the movement amount of the moving object can be enhanced corresponding to the resolution of analog signal components included in an output signal outputted by the light receiving signal processing section. Moreover, it becomes possible to detect the moving direction of the moving object on the basis of waveform fluctuation of the analog signal components.

It is to be noted that as the analog signal generation circuit, the circuits formed by adding capacity to an amplifier section for amplifying light receiving signals, a logic output circuit section and the like may be employed so as to provide time width to the rising edge and the falling edge of signals. As the analog signal generation circuit, the circuit may also be employed which, for example, reduces the gain of the amplifier section which amplifies light receiving signals so as to provide time width to the rising edge and the falling edge of signals. These circuits can all be configured very easily. The analog signals are not limited to those obtained from the light receiving signals but may be, for example, clock signals which form triangular waves.

In the optical encoder of one embodiment, the light receiving signal processing section comprises:

a digital signal generation circuit for generating a digital signal from the light receiving signal, the digital signal being different in phase from the analog signal generated by the analog signal generation circuit; and a subtraction circuit for subtracting the analog signal and the digital signal and for generating an output signal containing a plurality of signal components which are different in phase and different in signal level with respect to a predetermined threshold level.

In the optical encoder of this embodiment, the output signal is generated by the subtraction circuit included in the light receiving signal processing section, so that change in time constant due to change in gain of the aforementioned amplifier section and to addition of capacity are avoidable. Further, since any additional circuit such as oscillators is not necessity, it becomes possible to detect the movement amount and the moving direction of the moving object with high precision without provision of frequency dependence.

An electronic equipment of one embodiment includes the optical encoder according to the present invention and further has a comparison section for comparing an output signal, which is outputted from the light receiving signal processing section and which contains a plurality of signal components different in phase and different in signal level with respect to a predetermined threshold level, with a reference voltage corresponding to the threshold level, and for outputting a comparison result.

In the electronic equipment of the present embodiment, the comparison section can output a signal converted into a digital signal by comparing the output signal from the optical encoder with the reference voltage corresponding to the threshold level. More specifically, even when an output signal from the optical encoder is an analog output signal and therefore direct signal processing by microcomputers and the like cannot be performed, the output signal can be converted into a digital signal by the comparison section. Therefore, the movement information on the moving object can be obtained by inputting the digitized output signal from the comparison section into the microcomputer included in the electronic equipment. For example, employing the electronic equipment of the present embodiment in ink head sections in ink-jet printers makes it possible to easily obtain the movement information on the ink head sections as moving objects while the number of interconnections outputted from the optical encoder is still reduced.

An electronic equipment of one embodiment includes the optical encoder of the one embodiment and further has a comparison section for comparing an output signal, which is outputted by the light receiving signal processing section and which contains an analog signal component, with a plurality of different reference voltages and for outputting a plurality of digital signals based on a comparison result.

In the optical encoder in the present embodiment, with a plurality of digital signals outputted by the comparison section, highly precise movement information on the moving object can be obtained. Moreover, since the comparison section outputs digital signals, direct signal processing by microcomputers and the like can be performed.

Moreover, the electronic equipment in one embodiment includes the optical encoder according to the present invention. According to the electronic equipment, it becomes possible to achieve miniaturization by reducing the number of interconnections for optical encoders and to detect movement information with high precision.

According to the optical encoder of the present invention, the light receiving signal processing section converts a plurality of light receiving signals different in phase into an output signal containing a plurality of signal components different in phase and different in signal level with respect to a predetermined threshold level. With this output signal, it becomes possible to transmit a plurality of movement information sets with use of a single transmission path. Moreover, since the output signal has a plurality of output components with different phases per one cycle, position information can be obtained with high precision, and miniaturization of encoder modules as well as simplification of electric interconnections can be achieved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a waveform chart showing each signal waveform in a light receiving signal processing section of the first embodiment;

FIG. 4 is a waveform chart showing each signal waveform in a light receiving signal processing section of the second embodiment;

FIG. 6A is a waveform chart showing each signal waveform in a light receiving signal processing section of the third embodiment;

FIG. 6B is a waveform chart showing each signal waveform in a light receiving signal processing section of the third embodiment;

FIG. 9B is a circuit diagram showing a part of a light receiving signal processing section in the optical encoder of the fifth embodiment;

FIG. 10 is a waveform chart showing each signal waveform in a light receiving signal processing section of the fifth embodiment;

FIG. 12A is a waveform chart showing each signal waveform in a light receiving signal processing section of the sixth embodiment; and FIG. 12B is a waveform chart showing each signal waveform in a light receiving signal processing section of the sixth embodiment;

DETAILED DESCRIPTION OF THE INVENTION

Hereinbelow, the present invention will be described in details in conjunction with the embodiments with reference to the drawings.

First Embodiment

Figure 1:
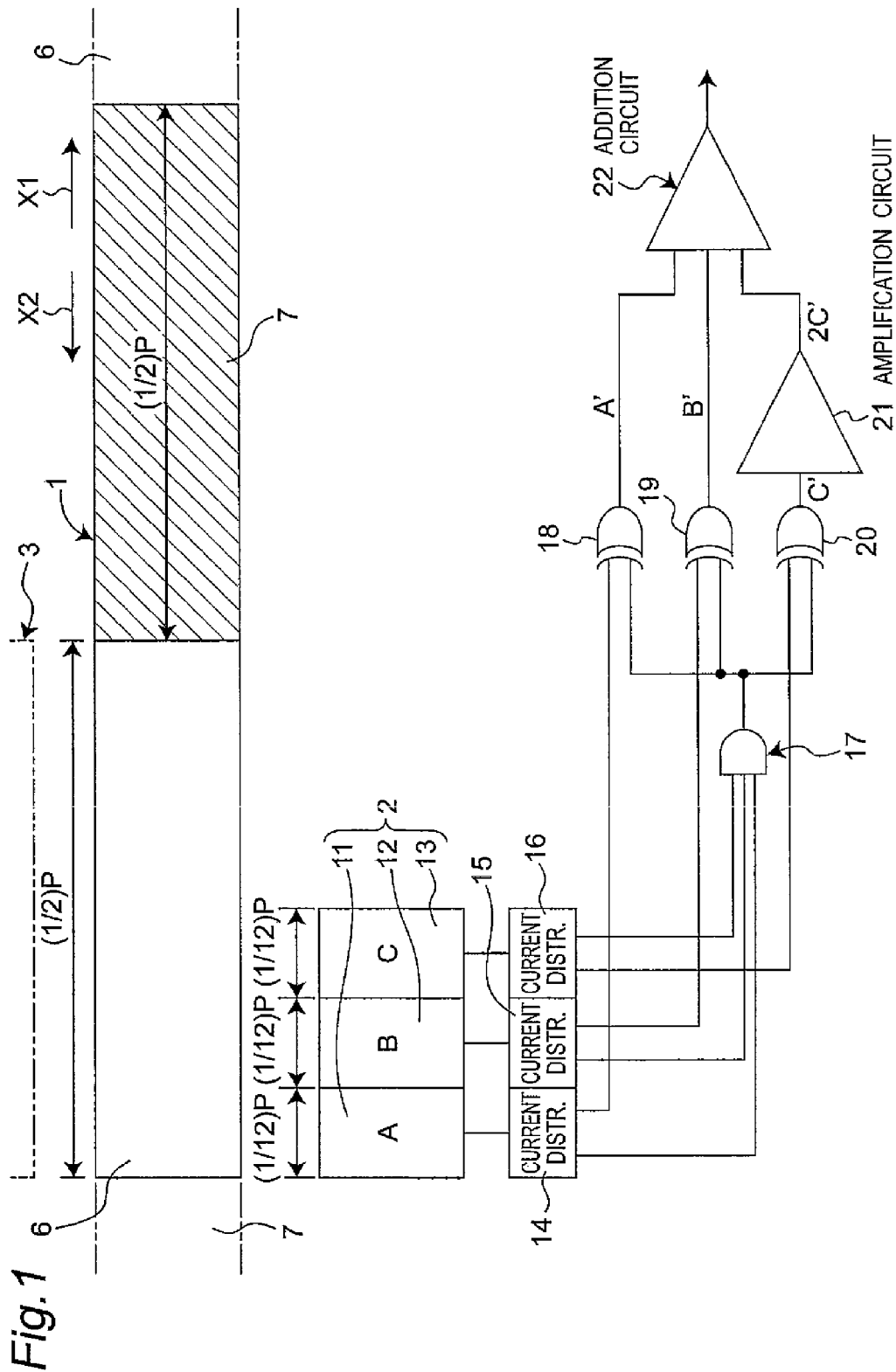
FIG. 1 is a schematic view showing an optical encoder in a first embodiment of the invention.

FIG. 1 shows an optical encoder in a first embodiment of the invention. The first embodiment is composed of a moving object 1, a light receiving section 2, and a light emitting section 3. The light emitting section 3 is constituted of light emitting elements such as LEDs (Light Emitting Diodes). The light receiving section 2 has three light receiving elements 11 to 13. The moving object 1 is movable in the direction shown by arrow X1 or X2, with a light-ON section 6 and a light-OFF section 7 being alternately arranged in the moving direction. With the array pitch of the light-ON section 6 being P, the moving direction size (width size) of the light-ON section 6 and the light-OFF section 7 is (½)P. The light-ON section 6 passes a light beam from the light emitting section 3 to the light receiving section 2 side, while the light-OFF section 7 does not pass the light beam from the light emitting section 3 to the light receiving section 2 side. Although the light receiving elements 11 to 13 are constituted from photo diodes in the present embodiment, they may be constituted from phototransistors. In the present embodiment, the width size of each light receiving element 11 to 13 is set to (1/12)P. Each light receiving element 11 to 13 is adjacent to each other without intervals in the moving direction.

Therefore, with 1 pitch P being set to 360 degrees, light receiving signals A, B and C respectively outputted by light receiving elements 11, 12, 13 each have a phase shifted from each other by 30 degrees as shown in FIG. 2. The light receiving signals A, B, C outputted by the light receiving elements 11, 12, 13 are inputted into an AND circuit 17 via current distributors 14, 15, 16 and an AD converter (not shown) and are subjected to AND operation. The AND circuit 17 outputs a wave-like AND signal A·B·C shown in FIG. 2 to three exclusive OR circuits 18 to 20.

The AND signal A·B·C and a light receiving signal A traveling via the current distributor 14 and the AD converter are inputted into the exclusive OR circuit 18, which calculates exclusive OR of both the signals and outputs a calculated signal A' to an addition circuit 22. The AND signal A·B·C and a light receiving signal B traveling via the current distributor 15 and the AD converter are inputted into the exclusive OR circuit 19, which calculates exclusive OR of both the signals and outputs a calculated signal B' to the addition circuit 22. The AND signal A·B·C and a light receiving signal C traveling via the current distributor 16 and the AD converter are inputted into the exclusive OR circuit 20, which calculates exclusive OR of both the signals and outputs a calculated signal C' to an amplification circuit 21. Then, the addition circuit 22 adds the calculated signals A', B' and a signal 2C' amplified twofold by the amplification circuit 21 together and outputs a wave-like output signal as shown in FIG. 2.

The current distributors 14 to 16, the AD converter, the AND circuit 17, the exclusive OR circuits 18, 19, 20, the amplification circuit 21, and the addition circuit 22 constitute a light receiving signal processing section.

In the output signal, as shown in FIG. 2, a pulse S1 which rises between a threshold level 0 and a threshold level 1 serves as an A-phase signal component, a pulse S2 which rises between the threshold level 1 and a threshold level 2 serves as a B-phase signal component, and a pulse S3 which rises exceeding the threshold level 2 serves as a C-phase signal component. Therefore, in the downstream signal processing section, the relative movement information on the moving object 1 can be obtained by, for example, counting rising edge components with respect to the threshold levels 0 to 2. Moreover, the forward and the backward (X1, X2) of the moving direction of the moving object 1 may be distinguished based on the precedent or following relation of the pulse rising edges of the A-phase signal component and the C-phase signal component. Therefore, according to the present embodiment, the addition circuit 22 can incorporate A to C three phase signal components, which are different in signal level and phase, in an output signal outputted to a single transmission path without losing movement information components. Therefore, in the present embodiment, it becomes possible to obtain highly precise movement information while achieving miniaturization and simplification of electric interconnections.

Although one detection section composed of the light receiving section 2 and the light receiving signal processing section is provided in this embodiment, a plurality of detection sections may be provided so that the movement of a plurality of moving objects which move in the directions different from each other may be detected by a plurality of the detection sections. Accordingly, it becomes possible to obtain highly precise movement information on two or more moving objects, to reduce the number of transmission paths of output signals by half, and to achieve miniaturization of encoder modules and simplification of electric interconnections. For example, in the case of detecting moving directions such as two dimensional and three dimensional moving directions with two or more moving objects, the number of the transmission paths of output signals can be reduced by half from conventional number of 4 and 6 to 2 and 3. Although the two-dimensional moving directions may be, by way of example, a direction X and a direction Y which inclines 90 degrees with respect to the direction X, it should naturally be understood that the angle of inclination is not limited to 90 degrees but may be any angle as long as different moving directions can be formed. Moreover, it also should be understood that a direction X, a direction Y and a direction Z as the three-dimensional directions are not limited to those forming right angles with each other like rectangular-coordinates.

Second Embodiment

Figure 3A:
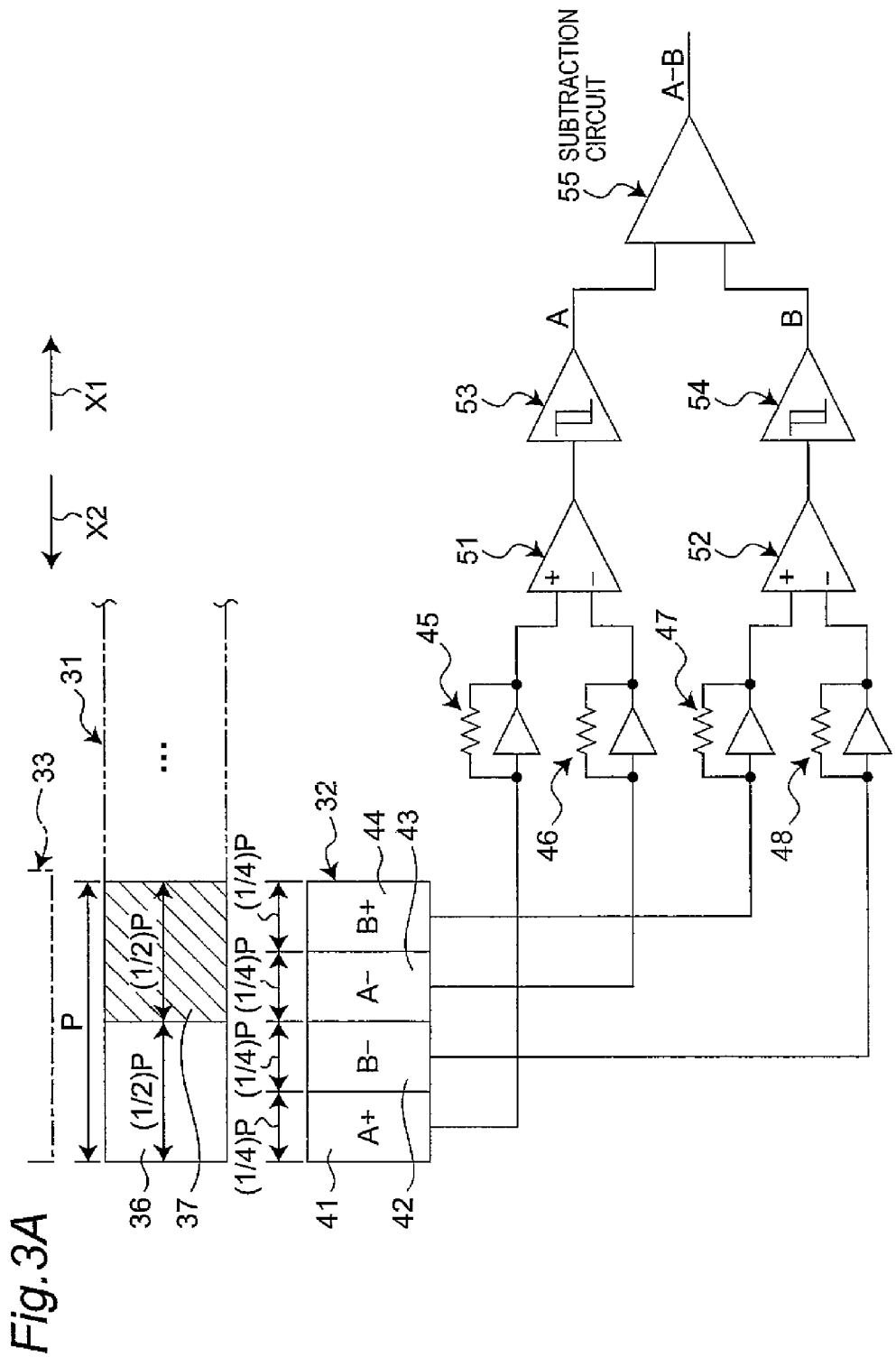
FIG. 3A is a schematic view showing an optical encoder in a second embodiment of the invention.

FIG. 3A shows an optical encoder in a second embodiment of the invention. The second embodiment is composed of a moving object 31, a light receiving section 32, and a light emitting section 33. The light emitting section 33 is constituted from light emitting elements such as LEDs (Light Emitting Diodes).

The light receiving section 32 has four light receiving elements 41 to 44. The moving object 31 is movable in the direction shown by arrow X1 or X2, with a light-ON section 36 and a light-OFF section 37 being alternately arranged in the moving direction. With the array pitch of the light-ON section 36 being P, the moving direction size (width size) of the light-ON section 36 and the light-OFF section 37 is (½)P. The light-ON section 36 passes a light beam from the light emitting section 33 to the light receiving section 32 side, while the light-OFF section 37 does not pass the light beam from the light emitting section 33 to the light receiving section 32 side. It is to be noted that the light receiving elements 41 to 44 are made of photodiodes. In the present embodiment, the width size of each light receiving element 41 to 44 is set to (¼)P. Each light receiving element 41 to 44 is adjacent to each other without intervals in the moving direction.

A light receiving signal A+ outputted by the light receiving element 41 is inputted into a non-inverting input terminal of a differential amplifier 51 via a current voltage conversion section 45, while a light receiving signal A− outputted by the light receiving element 43 is inputted into an inverting input terminal of the differential amplifier 51 via a current voltage conversion section 46. A light receiving signal B− outputted by the light receiving element 42 is inputted into an inverting input terminal of a differential amplifier 52 via a current voltage conversion section 48, while a light receiving signal B+ outputted by the light receiving element 44 is inputted into a non-inverting input terminal of the differential amplifier 52 via a current voltage conversion section 47.

The differential amplifier 51 amplifies a difference between the light receiving signal A+ converted into voltage and the light receiving signal A− converted into voltage, and outputs this amplified signal to an AD converter 53. The differential amplifier 52 amplifies a difference between the light receiving signal B+ converted into voltage and the light receiving signal B− converted into voltage, and outputs this amplified signal to an AD converter 54.

Then, the AD converter 53 converts the amplified signal inputted from the differential amplifier 51 into a digital signal A and outputs it to a subtraction circuit 55, while the AD converter 54 converts the amplified signal inputted from the differential amplifier 52 into a digital signal B and outputs it to a subtraction circuit 55. Then, the subtraction circuit 55 subtracts the digital signal B from the digital signal A, and outputs a subtracted signal (A−B).

In the second embodiment, the current voltage conversion sections 45 to 48, the differential amplifiers 51, 52, the AD converters 53, 54, and the subtraction circuit 55 constitute a light receiving signal processing section.

The column "A-PHASE PRECEDENCE" of FIG. 4 shows the signal waveforms of the digital signals A, B outputted from the AD converters 53, 54 and the subtracted signal (A−B) outputted by the subtraction circuit 55 when the moving object 31 moves in the direction of arrow X1. The column "B-PHASE PRECEDENCE" of FIG. 4 shows the signal waveforms of the digital signals A, B outputted from the AD converters 53, 54 and the subtracted signal (A−B) outputted by the subtraction circuit 55 when the moving object 31 moves in the direction of arrow X2.

According to the present embodiment as shown in FIG. 4, the digital signal B is subtracted from the digital signal A in the subtraction circuit 55 so that a subtracted signal (A−B) containing an A-phase component As and a B-phase component Bs which are different in phase and different in signal level with respect to a predetermined threshold level SL is generated as an output signal.

In the present embodiment, as shown in the "A-PHASE PRECEDENCE" column in FIG. 4, it can be determined that the moving object 31 moves in the direction of arrow X1 when the A-phase component As on the upper side of the threshold level SL precedes the B-phase component Bs on the lower side of the threshold level SL. As shown in the column "B-PHASE PRECEDENCE" in FIG. 4, it can be determined that the moving object 31 moves in the direction of arrow X2 when the B-phase component Bs precedes the A-phase component As.

Moreover in the present embodiment, unlike the conventional example in which a single pulse is created and outputted with use of a pulse modulator or an oscillator, it becomes possible to obtain the subtracted signal (A−B) having a plurality of output components As and Bs which are different in phase in one cycle, to acquire highly precise position information, and to achieve simplification of electric interconnections and reduction of a mounting area only by adding the subtraction circuit 55 which can sufficiently be integrated in the signal processing section.

Figure 3B:
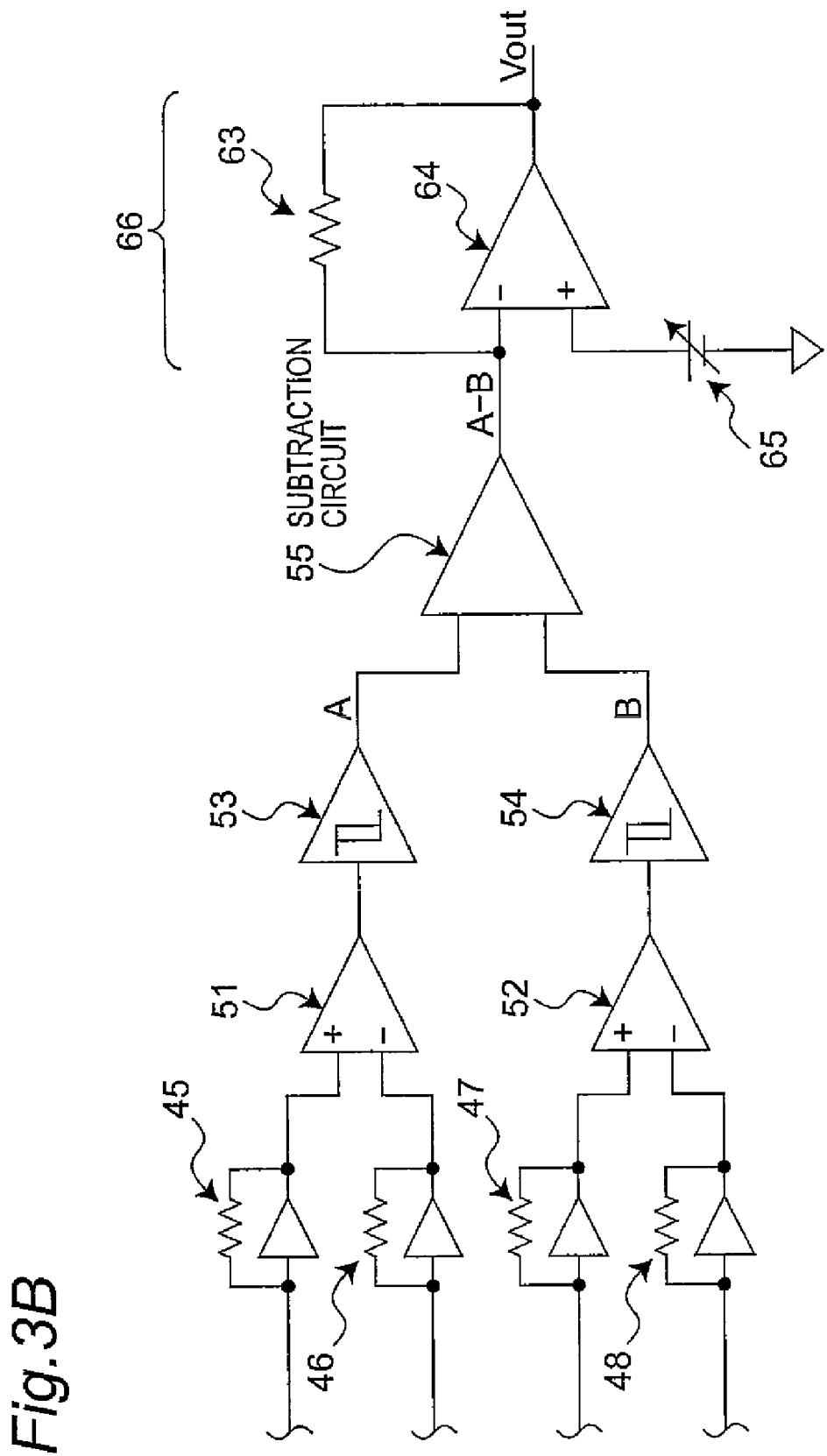
FIG. 3B is a schematic view showing a modified example of the second embodiment.

FIG. 3B shows a modified example of the second embodiment. In this modified example, a comparison section 66 is connected to the output side of the subtraction circuit 55. This comparison section 66 is composed of an operational amplifier 64, a feedback resister 63 connected to between the output side of the operational amplifier 64 and an inverting input terminal of the operational amplifier 64, and a reference voltage section 65 connected to a non-inverting input terminal of the operational amplifier 64. In this modified example, as shown in FIG. 3B, a subtracted signal (A−B) outputted by the subtraction circuit 55 is inputted into the comparison section 66. The subtracted signal (A−B) is inputted into the inverting input terminal of the operational amplifier 64 included in the comparison section 66, while a reference voltage from the reference voltage section 65 is inputted into the non-inverting input terminal of the operational amplifier 64. According to output signals of the operational amplifier 64, stable threshold levels can be obtained. Moreover, by changing the value of the reference voltage generated by the reference voltage section 65, it becomes possible to take out and output a desired signal component from the subtracted signal (A−B). For example, in the case where information about the moving direction is not required, or in the case where high precision is not required of the movement information, the reference voltage is set to be a supply voltage or a ground (GND) so that movement information only on one phase out of the A-phase and B-phase can be acquired.

In the modified example, the output of the operational amplifier 64 is returned to the inverting input terminal by a negative feedback circuit formed by the feedback resister 63, and therefore desired output amplitude can be obtained by changing the resistance of the feedback resister 63. Moreover, it is also possible to curtail the amplitude fluctuation of output signals by connecting a diode, instead of the feedback resister 63, to between the output of the operational amplifier 64 and the inverting input terminal thereof.

Figure 7:
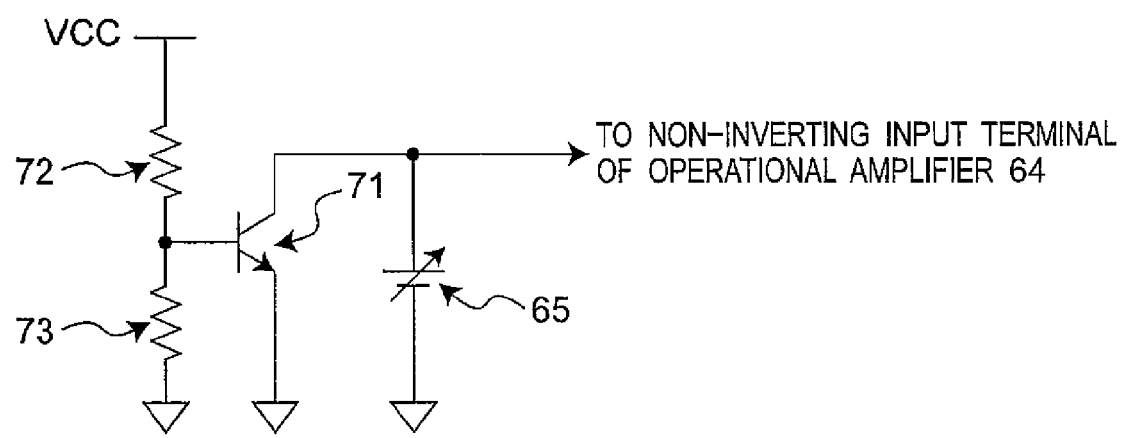
FIG. 7 is a circuit diagram showing a modified example of the reference voltage section of the third embodiment.

In the present embodiment, as shown in FIG. 7, a collector of an npn transistor 71 may be connected to the reference voltage section 65, while a base thereof may be connected to a junction point between a resistance 72 and a resistance 73, and a voltage Vcc of a power supply connected to the resistance 72 may be set at a fixed value or more, so that the reference voltage inputted into the non-inverting input terminal of the operational amplifier 64 can be changed. Thereby, it becomes possible to change the reference voltage inside the light receiving signal processing section only by adjusting supply voltage and to take out and output a desired signal component from the subtracted signal (A−B) without increasing the number of output interconnections from the light receiving signal processing section. Consequently, external signal processing can be simplified when a plurality of output components are outputted with one transmission path.

Third Embodiment

Figure 5:
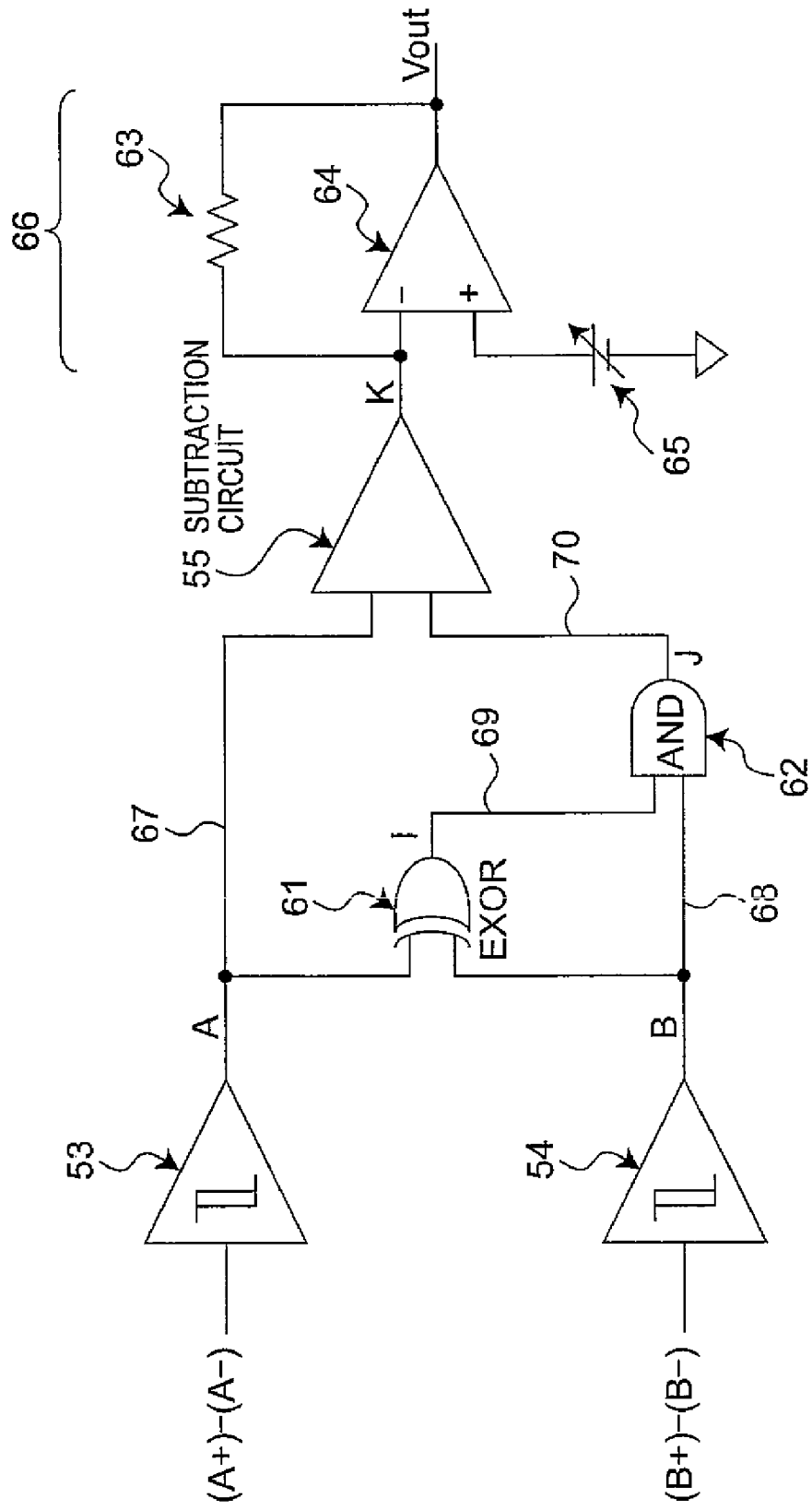
FIG. 5 is a schematic view showing an optical encoder in a third embodiment of the invention.

FIG. 5 shows an optical encoder in a third embodiment of the present invention. The third embodiment is different from the aforementioned second embodiment in the point that an exclusive OR circuit 61 and an AND circuit 62 are connected to between the AD converters 53, 54 and the subtraction circuit 55 of the second embodiment, and in the point that a comparison section 66 is connected to the output side of the subtraction circuit 55. Therefore, the third embodiment is similar to the second embodiment in the point that the moving object 31, the light receiving section 32, the light emitting section 33 and the current voltage conversion sections 45 to 48 shown in FIG. 3A are provided. Therefore, in this third embodiment, component members identical to those in the second embodiment are designated by identical reference numerals, and description will be mainly given of the portions different from the second embodiment.

As shown in FIG. 5, in the third embodiment, an output line 67 of the AD converter 53 and an output line 68 of the AD converter 54 are connected to the input side of the exclusive OR circuit 61. The output line 68 of the AD converter 54 and an output line 69 of the exclusive OR circuit 61 are connected to the input side of the AND circuit 62. Also, an output line 70 of the AND circuit 62 and the output line 67 of the AD converter 53 are connected to the input side of the subtraction circuit 55.

The output of the subtraction circuit 55 is connected to the comparison section 66. The comparison section 66 is composed of a operational amplifier 64, a feedback resister 63 connected to between the output side of the operational amplifier 64 and an inverting input terminal of the operational amplifier 64, and a reference voltage section 65 connected to a non-inverting input terminal of the operational amplifier 64.

In the third embodiment, digital signals A, B as first, second signals which are outputted from the AD converters 53, 54 and which are different in phase from each other by 90 degrees are inputted into the exclusive OR circuit 61, which outputs a third signal I generated by calculating exclusive OR of the digital signals A and B into the output line 69.

The AND circuit 62 calculates logical AND of the digital signal B inputted from AD converter 54 and the third signal I inputted from the exclusive OR circuit 61, and outputs a fourth signal J to the output line 70. Then, the subtraction circuit 55 subtracts the fourth signal J from the digital signal A inputted from the AD converter 53, and outputs a fifth signal K.

FIG. 6A shows signal waveforms of digital signals A, B as the first and second signals, the third signal I, the fourth signal J, and the fifth signal K when the moving object 31 shown in FIG. 3 moves in the direction of arrow X1. FIG. 6B shows signal waveforms of digital signals A, B as the first and second signals, the third signal I, the fourth signal J, and the fifth signal K when the moving object 31 shown in FIG. 3 moves in the direction of arrow X2.

In the signal waveform of the fifth signal K shown in FIG. 6A and FIG. 6B, a signal component As on the upper side of a threshold level SL corresponds to the digital signal A, while a signal component Bs on the lower side of the threshold level SL corresponds to the digital signal B. Therefore, in the present embodiment, the rising edge of the pulse of the signal component As and the rising edge of the pulse of the signal component Bs are independently counted so that information on relative position change can be obtained, and the fifth signal K can be transmitted with use of a single transmission path without lowering the resolution.

Moreover, the moving direction of the moving object 31 can be detected by detecting the temporal relationship of the pulse waveforms of the signal component As and the signal component Bs in the fifth signal K. For example, when the moving object 31 moves in the direction of arrow X1, the pulse waveform of the signal component Bs is generated immediately after the pulse waveform of the signal component As falls as shown in FIG. 6A. On the contrary, when the moving object 31 moves in the direction of arrow X2, the pulse waveform of the signal component Bs is generated after the lapse of ¼ cycle of the fifth signal K after the pulse waveform of the signal component As falls as shown in FIG. 6B.

Therefore, the moving direction of the moving object 31 can easily be detected by detecting the time difference between the signal component As and the signal component Bs in the fifth signal K outputted by the subtraction circuit 55. In FIG. 6A and FIG. 6B, the "As LOGICAL VALUE" under the waveform of the fifth signal K shows logic results "1" and "0" indicating whether or not the signal component As, which is sampled every ¼ cycle (25% of a duty cycle) of the signal K, is H (H level) with respect to the threshold level SL. In FIG. 6A and FIG. 6B, the "Bs LOGICAL VALUE" under the waveform of the fifth signal K shows logic results "1" and "0" indicating whether or not the signal component Bs, which is sampled every ¼ cycle (25% of a duty cycle) of the signal K, is L (L level) with respect to the threshold level SL.

Since the logic result of a section surrounded with a dashed dotted line BR in FIG. 6A and the logic result of a section surrounded with a dashed dotted line BR in FIG. 6B are different, it becomes possible to determine whether the moving object 31 moves in the direction of arrow X1 or in the direction of arrow X2 by comparing the logic results of both the sections. For example, displaying the signal waveform of the fifth signal K on waveform displays such as oscilloscopes makes it possible to detect the moving direction based on the difference in signal waveform, and this allows detection of the moving direction of the moving object at any moment. In the present embodiment, with the fifth signal K outputted by the subtraction circuit 55, a logical value can be changed by the forward or backward moving direction of the moving object 31, and it can correctly be detected whether the moving direction is forward or backward.

In the present embodiment, as shown in FIG. 5, the fifth signal K of the subtraction circuit 55 is inputted into the comparison section 66. The fifth signal K is inputted into the inverting input terminal of the operational amplifier 64 included in the comparison section 66, while a reference voltage from the reference voltage section 65 is inputted into the non-inverting input terminal of the operational amplifier 64. According to output signals of the operational amplifier 64, stable threshold levels can be obtained. Moreover, by changing the value of the reference voltage generated by the reference voltage section 65, it becomes possible to take out and output a desired signal component from the fifth signal K. For example, in the case where information about the moving direction is not required, or in the case where high precision is not required of the movement information, the reference voltage is set to be a supply voltage or a ground (GND) so that movement information only on one phase out of the A-phase and B-phase can be acquired.

In this embodiment, the output of the operational amplifier 64 is returned to the inverting input terminal by a negative feedback circuit formed by the feedback resister 63, and therefore desired output amplitude can be obtained by changing the resistance of the feedback resister 63. Moreover, it is also possible to curtail the amplitude fluctuation of output signals by connecting a diode, instead of the feedback resister 63, to between the output of the operational amplifier 64 and the inverting input terminal thereof.

In the present embodiment, as shown in FIG. 7, a collector of an npn transistor 71 may be connected to the reference voltage section 65, while a base thereof may be connected to a junction point between a resistance 72 and a resistance 73, and a voltage Vcc of a power supply connected to the resistance 72 may be set at a fixed value or more, so that the reference voltage inputted into the non-inverting input terminal of the operational amplifier 64 can be changed. Thereby, it becomes possible to change the reference voltage inside the light receiving signal processing section only by adjusting supply voltage and to take out and output a desired signal component from the fifth signal K without increasing the number of output interconnections from the light receiving signal processing section. Consequently, external signal processing can be simplified when a plurality of output components are outputted with one transmission path.

Fourth Embodiment

Figure 8:
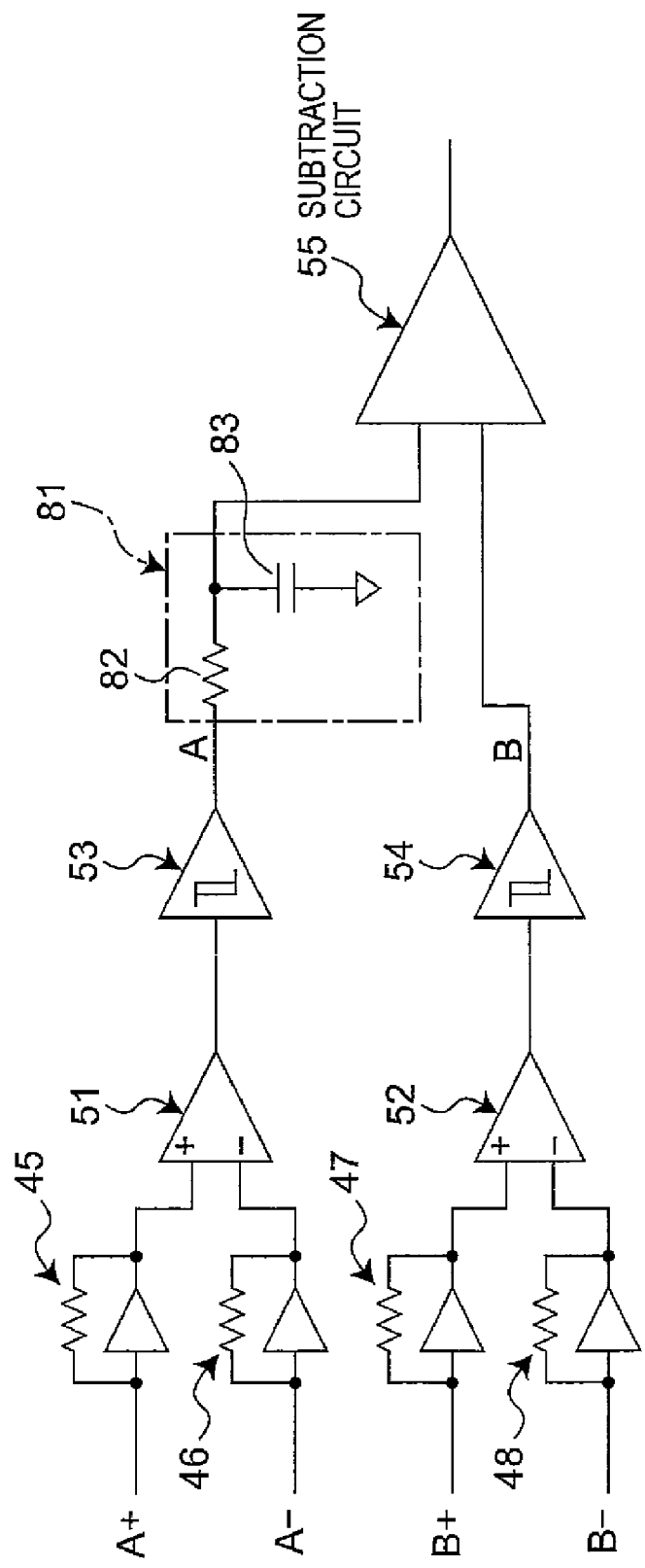
FIG. 8 is a circuit diagram showing a principle part of an optical encoder in a fourth embodiment of the invention.

FIG. 8 shows a principle part of an optical encoder in a fourth embodiment of the invention. The fourth embodiment is different from the aforementioned second embodiment in the point that a low pass filter 81 composed of a resistance 82 and a capacitor 83 is connected between the AD converter 53 and the subtraction circuit 55 of the second embodiment shown in FIG. 3A.

In the fourth embodiment, with the low pass filter 81 as an analog signal generation circuit, the rising edge and the falling edge of a square wave of the digital signal A outputted by the AD converter 53 shown in the FIG. 4 can be temporally dulled to make an analog waveform. Consequently, in the column "A-PHASE PRECEDENCE" in FIG. 4 showing the case where the moving object 31 of FIG. 3A moves in the direction of arrow X1, the rising edge of the A-phase component and the rising edge of the B-phase component of a subtracted signal (A−B) are smoothed corresponding to the time constant decided by the resistance 82 and the capacitor 83 of the low pass filter 81.

On the contrary, in the column "B-PHASE PRECEDENCE" in FIG. 4 showing the case where the moving object 31 of FIG. 3A moves in the direction of arrow X2, the falling edge of the A-phase component and the falling edge of the B-phase component of a subtracted signal (A−B) are smoothed corresponding to the time constant decided by the resistance 82 and the capacitor 83 of the low pass filter 81.

Therefore, according to the present embodiment, as shown in the column "A-PHASE PRECEDENCE" in FIG. 4, it can be determined that the moving object 31 moves in the direction of arrow X1 when the rising waveform of the A-phase component As of the subtracted signal (A−B) is smooth. As shown in the column "B-PHASE PRECEDENCE" in FIG. 4, it can be determined that the moving object 31 moves in the direction of arrow X1 when the falling-edge waveform of the A-phase component As of the subtracted signal (A−B) is smooth.

Therefore, according to the fourth embodiment, the moving direction of the moving object 31 can easy be determined by very simple circuit alteration, that is to connect the low pass filter 81 to between the AD converter 53 and the subtraction circuit 55 of the second embodiment.

Instead of connecting the low pass filter 81 to between the AD converter 53 and the subtraction circuit 55, a low pass filter may be connected to between the AD converter 54 and the subtraction circuit 55 so as to convert the digital signal B into a signal with analog waveform. What is necessary is to select signals to be converted into analog signals so that A-phase precedence and B-phase precedence can be distinguish. In short, the analog signals for conversion to analog signals are not limited to those obtained from the light receiving signals but may be, for example, clock signals which form a triangular wave.

Fifth Embodiment

Figure 9A:
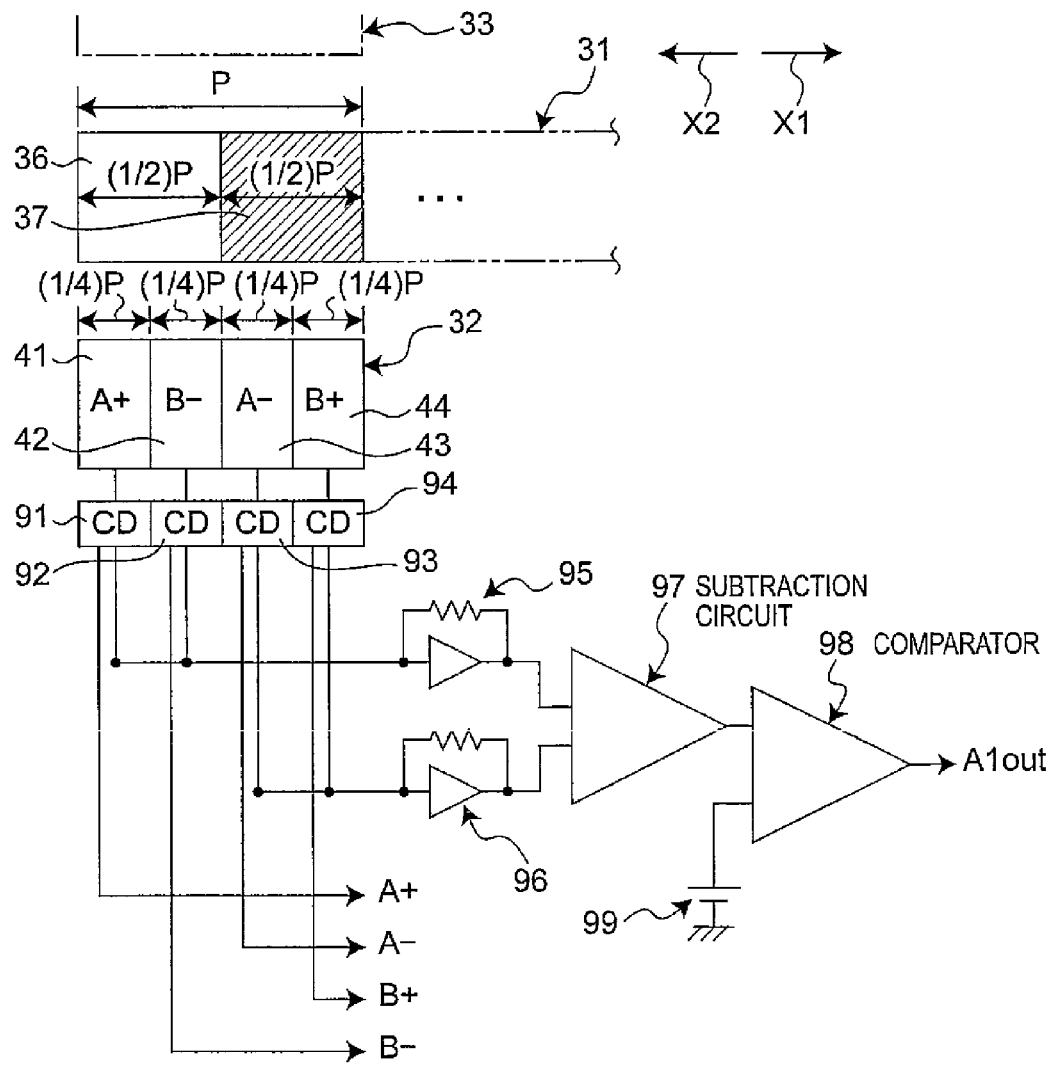
FIG. 9A is a schematic view showing a part of an optical encoder in a fifth embodiment of the invention.

FIGS. 9A and 9B show an optical encoder in a fifth embodiment of the invention. The fifth embodiment is different from the third embodiment in (1), (2) and (3) points shown below.

(1) As shown in FIG. 9B, the subtraction circuit 55 and the comparison section 66 of FIG. 5 are replaced with a subtraction circuit 90.

(2) As shown in FIG. 9A, four light receiving elements 41, 42, 43, 44 are respectively connected to current distributors 91, 92, 93, 94, which input light receiving signal A+, A−, B+, B− into current voltage conversion sections 45, 46, 47, 48 of FIG. 9B.

(3) As shown in FIG. 9A, a current voltage conversion section 95 connected to the current distributors 91, 92, a current voltage conversion section 96 connected to the current distributors 93, 94, a subtraction circuit 97 with an input side connected to the current voltage conversion sections 95, 96, and a comparator 98 for receiving an output signal of the subtraction circuit 97 are provided, and the output side of the comparator 98 is connected to the input side of the subtraction circuit 90 of FIG. 9B.

In the fifth embodiment, the current voltage conversion section 95 of FIG. 9A converts a signal ((A+)+(B−)) formed by adding light receiving signals A+ and B− into a voltage signal, and inputs it into the subtraction circuit 97. The movement of 1 pitch P of the moving object 31 corresponds to one cycle of the added signal ((A+)+(B−)). The current voltage conversion section 96 converts a signal ((A−)+(B+)) formed by adding light receiving signals A− and B+ into a voltage signal, and inputs it into the subtraction circuit 97. The movement of 1 pitch P of the moving object 31 corresponds to one cycle of the added signal ((A−)+(B+)). The added signal ((A−)+(B+)) and the added signal ((A−)+(B+)) are different in phase by 180 degrees.

Then, the subtraction circuit 97 subtracts the signal ((A−)+(B+)) from the signal ((A+)+(B−)), and inputs this subtracted signal into the comparator 98. The comparator 98 compares the subtracted signal with a fixed voltage VA from a direct current power supply 99 and outputs an analog output signal A1out. The analog output signal A1out is an analog waveform with a half-cycle triangular waveform as shown in FIG. 10 regardless of the moving direction of the moving object 31. One cycle of the triangle-wave analog output signal A1out corresponds to 1 pitch movement of the moving object 31.

As in the third embodiment, the AND circuit 62 of FIG. 9B calculates logical AND of a digital signal B inputted from the AD converter 54 and a third signal I inputted from the exclusive OR circuit 61, and outputs a fourth signal J to the output line 70. One cycle of the fourth signal J corresponds to 1 pitch movement of the moving object 31 as shown in FIG. 10.

Then, the fourth signal J and the analog output signal A1out outputted from the subtraction circuit 97 are inputted into the subtraction circuit 90, which subtracts the fourth signal J from the analog output signal A1out, and outputs an analog output signal A2out.

The column "A-PHASE PRECEDENCE" in FIG. 10 shows signal waveforms of the analog output signal A1out, the fourth signal J, and the analog output signal A2out when the moving object 31 moves in the direction of arrow X1. In this case, the analog output signal A2out has such a signal waveform that a square wave of ¼ cycle is outputted on the lower side the moment the analog output signal A1out falls. When the moving object 31 moves in the direction of arrow X2, as shown in the column "B-PHASE PRECEDENCE" in FIG. 10, the analog output signal A2out has such a signal waveform that a square wave is outputted on the lower side with a delay of ¼ cycle after the analog output signal A1out falls.

Therefore, according to the fifth embodiment, in the case of A-PHASE PRECEDENCE, the rectangular wave component of the analog output signal A2out outputted by the comparator 98 appears immediately after the triangular wave component of the analog output signal A1out. In the case of B-PHASE PRECEDENCE, the rectangular wave component of the analog output signal A2out outputted by the comparator 98 appears with a delay of ¼ cycle from the triangular wave component of the analog output signal A1out. With such a difference in waveform, the moving direction of the moving object 31 can easily be detected. According to the fifth embodiment, the movement amount is detectable with high precision because of the portion of the triangular wave of the analog output signal A2out. Moreover, in the fifth embodiment, change in gain of the amplifier and change in time constant are unnecessary, so that stable operation can be implemented in a wide frequency range.

Although the output signal J which is a logical AND between the exclusive OR of the digital signals A and B and the digital signal B is used as a digital signal in the embodiment, an AND signal between the exclusive OR of the digital signals A and B and the digital signal A may be used as a digital signal. What is necessary is to use digital signals which allow distinction between A-phase precedence and B-phase precedence.

Sixth Embodiment

Figure 11:
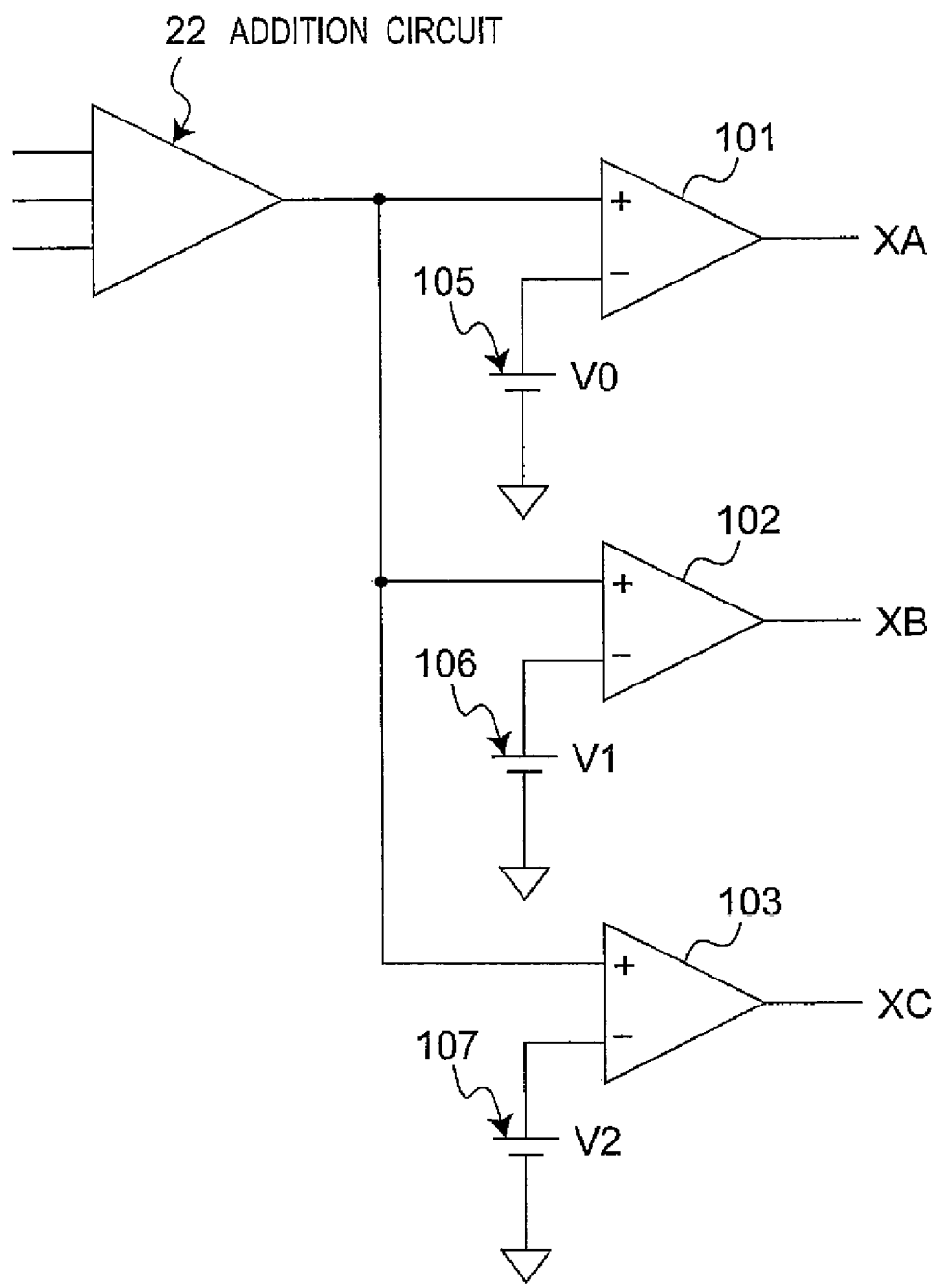
FIG. 11 is a view showing a part of a light receiving signal processing section in electronic equipment of a sixth embodiment of the invention.

FIG. 11 shows a sixth embodiment which is electronic equipment having the optical encoder of the first embodiment of the invention. The sixth embodiment is different from the aforementioned first embodiment in the point that first, second and third comparators 101, 102, 103 connected to the output side of the addition circuit 22 of the first embodiment in FIG. 1 are provided. Therefore, in the sixth embodiment, description is mainly given of the difference from the first embodiment.

In the sixth embodiment as shown in FIG. 11, three comparators, first to third comparators 101 to 103 are provided as comparison sections, and non-inverting input terminals of these three comparators 101 to 103 are connected to the output side of the addition circuit 22.

An inverting input terminal of the first comparator 101 is connected to a direct current power supply 105 which generates a first reference voltage V0. An inverting input terminal of the second comparator 102 is connected to a direct current power supply 106 which generates a second reference voltage V1. Also, an inverting input terminal of the third comparator 107 is connected to a direct current power supply 107 which generates a third reference voltage V2. The first, second and third reference voltages V0, V1, V2 respectively correspond to threshold levels 0, 1, 2 shown in FIG. 2, FIG. 12A and FIG. 12B.

FIG. 12A is a wave form chart showing the waveforms of light receiving signals A, B, C, the waveform of an output signal Y of the addition circuit 22, and the waveforms of output signals XA, XB, XC of the first, second, third comparators 101, 102, 103 when the moving object 1 of FIG. 1 moves in the direction of arrow X1. FIG. 12B is a wave form chart showing the waveforms of light receiving signals A, B, C, the waveform of an output signal Y of the addition circuit 22, and the waveforms of output signals XA, XB, XC of the first, second, and third comparators 101, 102, 103 when the moving object 1 of FIG. 1 moves in the direction of arrow X2.

As shown in FIG. 12A and FIG. 12B, the waveform of the output signal XA from the first comparator 101 is a waveform in which the logic is switched by rising and falling of the light receiving signals A and C. Since the movement amount of the moving object 1 can be detected with only the output signal XA, it is possible to provide only the first comparator 101 out of the first to third comparators 101 to 103. It is also possible to provide only any one of the first to third comparators 101 to 103.

The moving direction of the moving object 1 is undetectable with only the output signal XA. Then, the moving direction of the moving object 1 is detectable by detecting the difference in logic switching between the output signal XA and the output signal XC. For example, an exclusive OR of the output signal XA and the output signal XC is obtained in an exclusive OR circuit, and a signal Z of this exclusive OR is inputted as a counter clock signal. On the basis of the precedent or following relation of the signal Z of the exclusive OR, signals different in pulse width can be outputted, and the forward or backward (X1, X2) of the moving direction of the moving object 1 can be determined based on the length of the pulse width of the signals.

Moreover, instead of obtaining an exclusive OR of the output signal XA and the output signal XC, an exclusive OR of the output signal XA and the output signal XB may be obtained in an exclusive OR circuit, and a signal Z2 of the exclusive OR may be inputted as a counter clock signal. Signals different in pulse width may be outputted based on the precedent or following relation of the signal Z2 of the exclusive OR. In short, as shown in FIG. 12A and FIG. 12B, the moving direction of the moving object 1 can be detected by using the fact that the waveforms of the output signal XB and the output signal XC are different by the forward or backward moving direction of the moving object 1, and therefore it becomes possible to appropriately select any method, other than the method disclosed, for signal processing for these output signals. As for the signal processing, any easy method with use of microcomputers should be selected.

Therefore, according to the electronic equipment of the sixth embodiment, the first, second and third comparators 101, 102, 103 which compare the first, second and third reference voltages V0, V1, V2 with the output signal of the addition circuit 22 are connected to the AND circuit or an exclusive OR circuit, and an external signal processing section having a counter, so that movement information including the movement amount and the moving direction of the moving object 1 can easily be obtained while the number of output interconnections is still reduced.

According to the electronic equipment having the optical encoder of the first to fifth embodiments, it becomes possible to reduce the number of interconnections for the optical encoder so as to achieve miniaturization and to detect movement information with high precision. For example, by employing the electronic equipment of the sixth embodiment in ink head sections in ink-jet printers, it becomes possible to easily obtain the movement information on the ink head sections as moving objects while the number of interconnections outputted from the optical encoder is still reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An optical encoder comprising:
a light emitting section; and
a light receiving section having a plurality of light receiving elements placed so as to be aligned in one direction in an area where a light beam from the light emitting section reaches, for detecting movement of a moving object which is composed of a light-ON section for enabling the light beam to come incident into the light receiving element when the moving object passes through a predetermined position corresponding to the light receiving element, and a light-OFF section for disabling the light beam from coming incident into the light receiving element when the moving object passes through a predetermined position corresponding to the light receiving element the light-ON section and the light-OFF section alternately passing through the predetermined position when the moving object moves in the one direction, the optical encoder further comprising a light receiving signal processing section for receiving inputs of a plurality of light receiving signals with different phases from a plurality of the light receiving elements, performing signal processing including at least one signal processing among a logical operation processing, an addition processing and a subtraction processing on a plurality of the light receiving signals, and outputting an output signal containing a plurality of signal components which are different in phase and different in signal level with respect to a predetermined threshold level, wherein the light receiving signal processing section comprises:

an exclusive OR circuit for calculating exclusive OR of first and second signals, which are obtained from a plurality of the light receiving signals and which are different in phase from each other by 90 degrees, and outputting a third signal;

an AND circuit for calculating a logical AND of the third signal outputted from the exclusive OR circuit and one signal out of the first and second signals, and outputting a fourth signal; and a subtraction circuit for subtracting the fourth signal outputted from the AND circuit from the other signal out of the first and second signals, and outputting a fifth signal.

2. The optical encoder according to claim 1, wherein the light receiving signal processing section comprises a comparison section for comparing a signal outputted from the subtraction circuit with a predetermined reference voltage, and outputting a comparison result.

3. The optical encoder according to claim 1, wherein the light receiving signal processing section comprises a negative feedback circuit including an operational amplifier with an inverting input terminal for receiving an input of the fifth signal outputted from the subtraction circuit and with a non-inverting input terminal for receiving an input of a predetermined reference voltage.

4. The optical encoder according to claim 2, wherein the light receiving signal processing section comprises a reference voltage section which can change a value of the predetermined reference voltage.

5. Electronic equipment including the optical encoder according to claim 1.

6. Electronic equipment including the optical encoder according to claim 2.

7. Electronic equipment including the optical encoder according to claim 3.

8. Electronic equipment including the optical encoder according to claim 4.

* * * * *